United States Patent [19]

Wright et al.

[11] 4,356,241

[45] Oct. 26, 1982

[54] SODIUM SULPHUR CELLS

[75] Inventors: Michael L. Wright, Allestree; Michael D. Hames, Spondon, both of England

[73] Assignee: Chloride Silent Power Limited, London, England

[21] Appl. No.: 280,957

[22] Filed: Jul. 7, 1981

[30] Foreign Application Priority Data

Jul. 21, 1980 [GB] United Kingdom ............... 8023739

[51] Int. Cl.$^3$ ............................................. H01M 4/36
[52] U.S. Cl. .................................. 429/104; 429/126; 429/193
[58] Field of Search ................ 429/104, 193, 102, 126

[56] References Cited

U.S. PATENT DOCUMENTS 4,220,691  9/1980  Roth et al. ........................ 429/104
4,248,943  2/1981  Ludwig et al. .................... 429/104
4,294,897  10/1981  Binden ............................. 429/104

*Primary Examiner*—Charles F. LeFevour
*Attorney, Agent, or Firm*—Beveridge, DeGrandi & Kline

[57] ABSTRACT

In a sodium sulphur cell having beta alumina solid electrolyte material separating an anodic region containing sodium from a cathodic region, the surface of the electrolyte exposed to the sodium is pretreated with a first metal, conveniently lead, which will form an alloy with sodium and the anodic region contains a second metal, e.g. titanium or aluminium which will react with sodium oxide to form a sodium oxide compound of the second metal or an oxide thereof. The combined effect of these features gives a significant improvement in preventing resistance rise of the cell on discharge.

11 Claims, 4 Drawing Figures

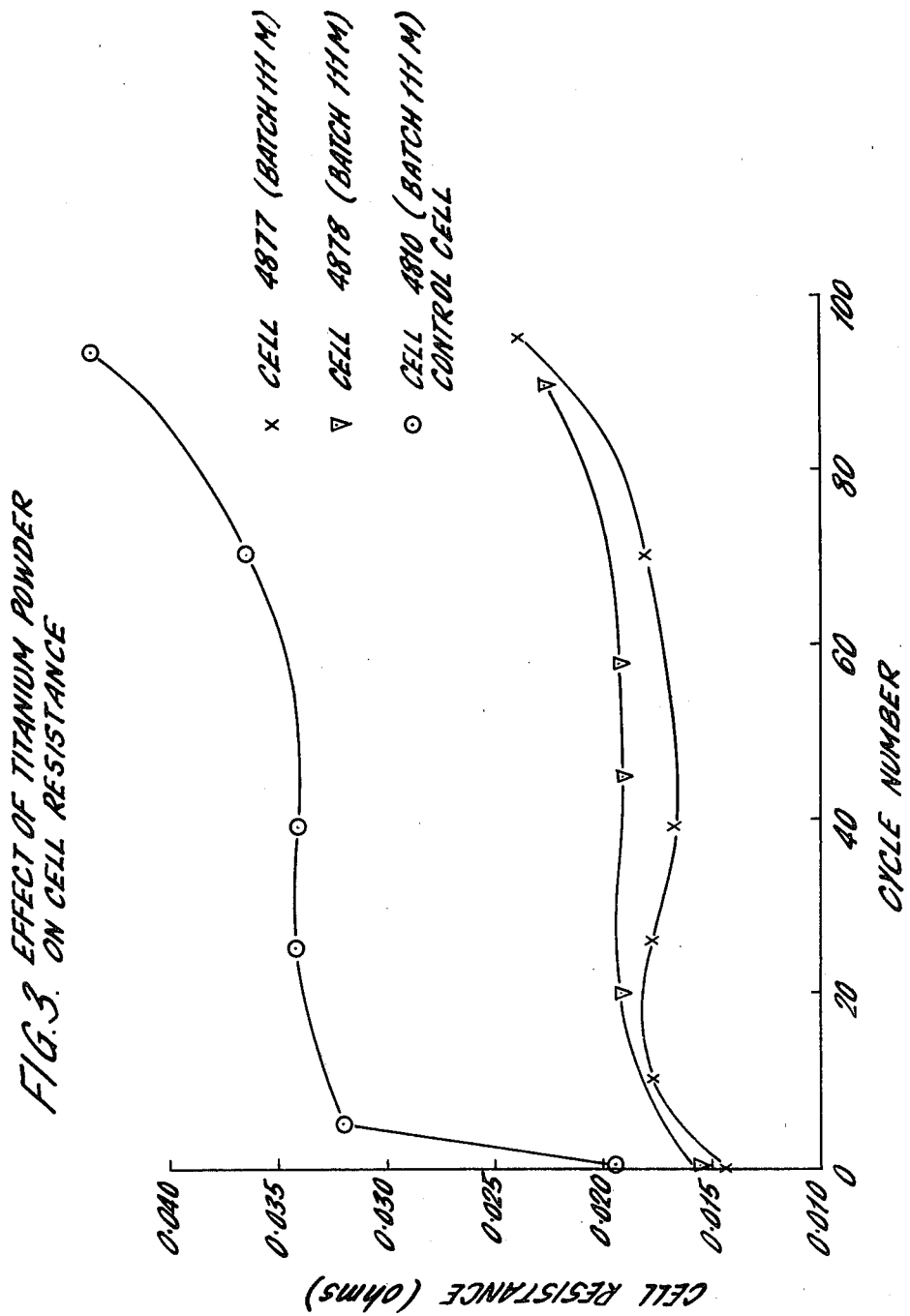

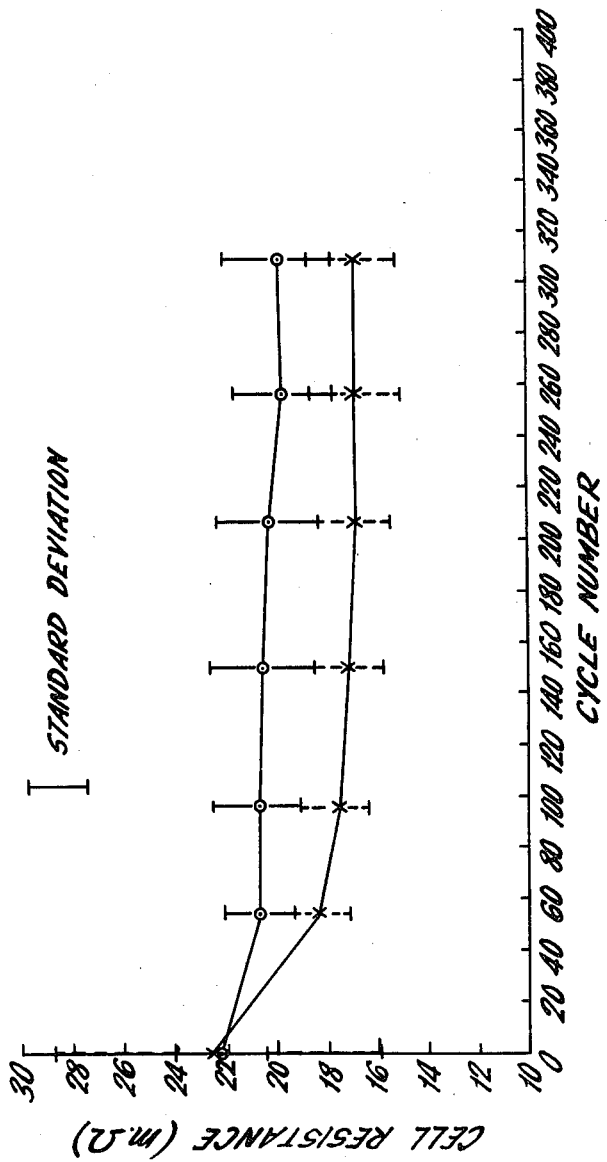

SODIUM SULPHUR CELLS

BACKGROUND OF THE INVENTION

1. Field of the Invention

This invention relates to sodium sulphur cells containing beta-alumina electrolyte material.

2. Prior Art

Beta-alumina electrolyte material is used as a solid electrolyte in electrochemical cells and other energy conversion devices, it being a material through which sodium ions can pass. A typical example of such a cell is a sodium sulphur cell; in this case the beta-alumina separates molten sodium from a cathodic reactant comprising sulphur and sodium polysulphides. During the operation of sodium sulphur cells, difficulty is sometimes encountered in wetting the beta-alumina electrolyte surface with sodium. This can be overcome, in some instances, by heating the beta-alumina to a high temperature, for example in excess of 400° C.

In the specification of U.S. Pat. application No. 217,333 of M. L. Wright, filed on Dec. 17, 1980 and corresponding to U.K. Application No. 7,944,410 there is described a method of improving the wettability of the beta-alumina by sodium, which method comprises the pre-treatment of at least a part of the surface of the beta-alumina with a metal which will form an alloy with sodium. For use in a cell or other energy conversion device having a predetermined operating temperature, such as a sodium sulphur cell, this metal is preferably a metal which will form, with sodium, an alloy having a melting point below the operating temperature of the cell in which the electrolyte is to be used. For a sodium sulphur cell it is convenient to use lead as the metal. The beta-alumina may be treated with lead by painting it with a saturated aqueous solution of lead acetate, over the surface region to be treated, this being the surface region which would be exposed to sodium in the cell. Excess moisture is then evaporated off and the lead acetate thermally decomposed by heating, for example at 280° C., in an inert atmosphere such as a nitrogen atmosphere. A number of other metals may be used however instead of lead.

It is known, in a sodium sulphur cell, to put a gettering material in the sodium to remove impurities, see for example U.S. Pat. No. 4,220,691. It is also known, in sodium sulphur cells employing a glass electrolyte, to incorporate an active metal scavenger in the sodium to remove sodium oxide which, in such cells, may be formed by continuous leaching from the glass.

SUMMARY OF THE INVENTION

The above-described treatment of the beta-alumina with a metal capable of forming an alloy with sodium, by improving the wettability, by sodium, of the electrolyte, provides a partial solution to the problem of the rise in resistance which has often been found to occur during the operational life of a cell. This resistance rise is a change in the asymmetry of the cell resistance with time and/or cycles of charge and discharge. Only the discharge resistance increases; the charge resistance remains substantially constant. The cause of this resistance rise is not fully understood. It depends, inter alia, on the composition of the beta-alumina and appears to be primarily an interfacial effect at the interface between the electrolyte material and the sodium. We have now found that a substantial and unexpected further improvement, in preventing resistance rise, can be obtained in a cell having a beta-alumina electrolyte element which has been treated as described above, by adding a certain selected material or materials into the anodic region of the cell.

According to the present invention, in a sodium sulphur cell having sodium and sulphur/sodium, poly/sulphides separated by a beta-alumina solid electrolyte element which has had at least part of its surface, to be exposed to the sodium, pre-treated with a first metal which will form an alloy of sodium, there is provided, in the anodic region adjacent the electrolyte element, a second metal which will react with sodium oxide ($Na_2O$) to form a sodium oxide compound with the second metal or an oxide thereof.

Conveniently the first metal is lead but tin or bismuth may be employed. The first metal is preferably a metal which will form, with sodium, an alloy with a melting point below the operating temperature of the cell. This operating temperature is typically 350° C. for a sodium sulphur cell. However it is possible to operate sodium-sulphur cells at higher temperatures and thus more generally the metal is one which will form an alloy with sodium having a melting point below 450° C., provided the cell is operated at a temperature above the melting point of the alloy. The metal must not be deleterious to any components on the sodium side of the cell. The metal must be one which will not alter the lattice parameters of the beta-alumina sufficient to fracture the ceramic and, for this reason lithium and potassium cannot be used.

Metals which may be employed for this purpose include titanium metal, conveniently in the form of a sponge, or aluminium, conveniently in the form of a powder or flake. Other metals which may be employed include magnesium, zirconium, yttrium and uranium.

It will be seen that essentially the additional material is a material which reacts with unwanted contaminants, particularly sodium oxide, in the sodium electrode. It is believed that the resistance rise of a cell on repeated charge-discharge cycling may be due to such contaminants in the sodium reacting with the beta-alumina electrolyte to change the properties thereof, for example its wettability by liquid sodium. The second metal must be one which does not adversely affect the cell properties.

The anodic region adjacent the electrolyte may contain a further particulate material, e.g. carbon, in addition to the second metal. The amount of the second metal required need only be sufficient to deal with the amount of impurities present. Since however it is desirable to provide a wicking or capillary filling in the sodium region adjacent to the electrolyte surface, this region may contain an inert particulate material, e.g. glass balls or carbon powder, and may then be filled with a mixture containing sodium with at least 1 atomic % of an insoluble metal or sufficient of a soluble metal to give a saturated solution in sodium.

It is convenient to use a cylindrical cell in which the sodium is in an annular region between the anode current collector and one surface of a beta-alumina tube. The anode current collector may be inside the tube with the sodium inside the beta-alumina tube. Preferably however the sodium annulus lies around the outside of the beta-alumina tube and, in this case, the outer housing may constitute the anode current collector.

BRIEF DESCRIPTION OF THE DRAWINGS

FIGS. 3 and 4 are graphical diagrams showing experimental results, the diagrams having cell resistance (as ordinate) plotted against cycle number for cells being cyclically charged and discharged.

DESCRIPTION OF THE PREFERRED EMBODIMENTS

Figure 1:
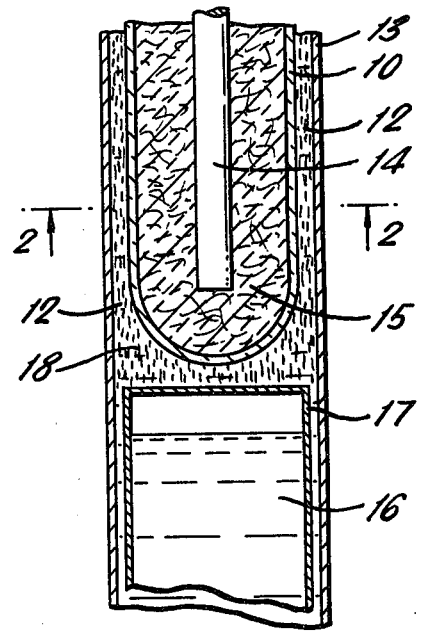
FIG. 1 is a diagrammatic part longitudinal section of a tubular sodium sulphur cell constituting one embodiment of the invention.
Figure 2:
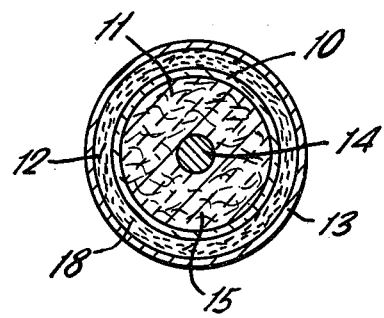
FIG. 2 is a transverse section through the cell of FIG. 1 along the line 2—2.

Referring to the drawings, there is shown diagrammatically a sodium sulphur cell in which an electrolyte tube 10 formed of beta-alumina and closed at one end separates a cathodic region 11 inside the tube from an annular anodic region 12 between the tube and an outer cylindrical steel housing 13. The cathodic region, in the known way, includes an axially extending cathode current collector 14 and a matrix 15 of fibre material, typically graphite fibre felt, which matrix is impregnated with sulphur/sodium polysulphides constituting the cathodic reactant. The fibre matrix extends between the inner surface of the electrolyte tube and the cathode current collector 14.

The anodic region 12 contains liquid sodium which has to cover the outer surface of the electrolyte tube. In operation, sodium passes as sodium ions through the electrolyte and into the cathodic region on discharge of the cell and passes in the reverse direction on charging of the cell. The bulk of the sodium is housed in a reservoir 16 spaced in the axial direction from the electrolyte tube. In this particular embodiment, the sodium reservoir includes an inverted can 17 containing an inert gas, e.g. nitrogen, under pressure so that the sodium is forced outwardly from the bottom of the can around the outside of the can and thence upwardly into the anodic region 12. Restrictor means (not shown) may be provided in the flow path between the reservoir and the annular region 10 to limit the flow rate.

The present invention is concerned more particularly with cells in which the electrolyte is pretreated with a metal or metal compound and in which certain other materials are also incorporated in the anodic region and the following is a description of a number of examples of the invention. In each of these examples, beta-alumina of composition, by weight, of 0.7% $LiO_2$, 8.9% $Na_2O$, balance $Al_2O_3$, was used.

EXAMPLE 1

In this example of the invention, in a sodium sulphur cell as described above and having a sodium annulus around a beta-alumina tube and having sulphur/polysulphides inside the beta-alumina tube, the sodium annulus was packed with a titanium sponge 18 having a mesh size less than 750 microns. The surface of the beta-alumina, before assembling in the cell, had been treated by painting with a saturated aqueous solution of lead acetate over the whole external surface of the tube which would be exposed to the sodium in the cell. Excess moisture was evaporated off and the lead acetate thermally decomposed by heating at 280° C. in a nitrogen atmosphere.

Table 1 below shows the performance of five cells formed in this way. The first two cells were cycled through 150 charge and discharge cycles whilst the remaining cells were cycled through 193 charge and discharge cycles. The table shows that the final resistance was, on average below the initial resistance. The increase in final resistance in one case was only small and in each of the other four cases there was a measurable drop in resistance.

TABLE 1

| Cycles | Initial Resistance | Final Resistance |
| --- | --- | --- |
| 150 | 16.4 milliohms | 15.4 milliohms |
| 150 | 18.4 milliohms | 17.4 milliohms |
| 193 | 17.0 milliohms | 16.6 milliohms |
| 193 | 16.4 milliohms | 16.0 milliohms |
| 193 | 18.7 milliohms | 18.9 milliohms |

EXAMPLE 2

Table 2 below shows the results of testing six sodium sulphur cells which were similar to those of Example 1 except that, in this example, the cells had aluminum powder 18 in the sodium annulus instead of titanium sponge. It will be seen that in this case the final resistance in two examples was below the initial resistance and the other four examples only slightly above.

TABLE 2

| Cycles | Initial Resistance | Final Resistance |
| --- | --- | --- |
| 150 | 20.6 milliohms | 19.4 milliohms |
| 102 (failed) | 18.9 milliohms | 20.5 milliohms |
| 150 | 20.2 milliohms | 18.7 milliohms |
| 193 | 17.5 milliohms | 18.7 milliohms |
| 193 | 20.3 milliohms | 21.9 milliohms |
| 193 | 18.7 milliohms | 22.5 milliohms |

EXAMPLE 3

Table 3 below shows the results of testing three sodium sulphur cells which were constructed in a manner similar to those of Example 1 above but in which the sodium annulus was packed with a mixture of 10% (by volume) of titanium sponge, of mesh size less than 750 microns, and 90% (by volume) of carbon spheres. It will again be seen that in two cases the final resistance was less than the initial resistance and in the third case, the final resistance was only slightly above the initial resistance.

TABLE 3

| Cycles | Initial Resistance | Final Resistance |
| --- | --- | --- |
| 37 | 16.8 milliohms | 16.7 milliohms |
| 37 | 17.4 milliohms | 17.8 milliohms |
| 37 | 18.4 milliohms | 17.6 milliohms |

EXAMPLE 4

Table 4 below shows the result of testing two sodium sulphur cells similar to those of Example 3 above but in which the sodium annulus had 10% by volume of aluminium powder instead of titanium sponge. It will be seen that there is only a small rise in resistance over the test period.

TABLE 4

| Cycles | Initial Resistance | Final Resistance |
| --- | --- | --- |
| 37 | 19.0 milliohms | 19.2 milliohms |
| 37 | 18.1 milliohms | 18.4 milliohms |

For comparison purposes Examples 5 and 6 below give the results on tests on sodium sulphur cells outside the scope of the present invention.

EXAMPLE 5

Table 5 below shows results on testing of five cells similar to those of Example 1 except in that the beta-alumina electrolyte had not been treated with lead acetate and in that the sodium annulus did not have any metal but contained only carbon powder.

It will be seen that in this example the final resistance in each case was more than double the initial resistance.

TABLE 5

| Cycles | Initial Resistance | Final Resistance |
| --- | --- | --- |
| 14 | 14.9 milliohms | 33.2 milliohms |
| 14 | 12.7 milliohms | 33.6 milliohms |
| 14 | 13.3 milliohms | 33.3 milliohms |
| 17 | 15.0 milliohms | 32.4 milliohms |
| 95 | 19.4 milliohms | 50.9 milliohms |

EXAMPLE 6

Table 6 below shows the results of testing of four cells similar to those of Example 1 and having a titanium sponge filling the sodium annulus around the outside of the beta-alumina tube but in which the beta-alumina tube had not been treated with lead acetate. It will be seen that, in this case, the final resistance was in general significantly higher than the initial resistance although, compared with Example 5, the provision of the titanium sponge has given an improvement in some cases.

TABLE 6

| Cycles | Initial Resistance | Final Resistance |
| --- | --- | --- |
| 24 | 13.8 milliohms | 16.3 milliohms |
| 95 | 14.4 milliohms | 24.2 milliohms |
| 89 | 14.9 milliohms | 22.6 milliohms |
| 17 | 14.0 milliohms | 15.6 milliohms |
| 119 | 22.9 milliohms | 43.9 milliohms |
| 77 | 23.4 milliohms | 44.3 milliohms |

FIG. 3 is a graphical diagram showing the rise in discharge resistance plotted against cycle number for cells which were cyclically charged and discharged. Curve 20 is a control cell and curves 21 and 22 are for test cells in which 3 grams of titanium sponge was incorporated in the sodium annulus of each cell. The control cell containing no titanium. The beta-alumina in these cells was untreated. It can be seen that all cells rose in resistance although the use of the titanium gave some improvement. When the sodium electrode was renewed in one of the cells to which titanium had been added, the resistance returned to its original value and remained stable, indicating that the rise in cell resistance had been due to an increase in the sodium/beta-alumina interfacial resistance.

FIG. 4 is a diagram similar to FIG. 3 in which for curve 30, aluminum powder was incorporated in the sodium annulus as described in example 2 above, and in which, for curve 31, titanium powder was incorporated in the sodium annulus as described in example 1 above. In the cells of FIG. 4, the beta-alumina was treated with lead acetate as previously described. It will be seen that the resistance rise was eliminated; moreover, on average, there was a slight reduction in cell resistance.

We claim:

1. A sodium sulphur cell having a beta-alumina solid electrolyte element separating an anodic region containing sodium from a cathodic region containing sulphur/sodium polysulphides, said beta-alumina solid electrolyte element has had at least part of its surface, to be exposed to the sodium, pretreated with a first metal which will form an alloy of sodium, wherein there is provided, in the anodic region adjacent the electrolyte element, a second metal which will react with sodium oxide ($Na_2O$) to form a sodium oxide compound with the second metal or an oxide thereof.

2. A sodium sulphur cell as claimed in claim 1 wherein said second metal is titanium.

3. A sodium sulphur cell as claimed in claim 2 wherein the titanium is in the form of a sponge.

4. A sodium sulphur cell as claimed in claim 1 wherein the second metal is aluminium.

5. A sodium sulphur cell as claimed in claim 4 wherein the aluminium is in powder or flake form.

6. A sodium sulphur cell as claimed in claim 1 wherein said second metal is a metal selected from the group consisting of magnesium, zirconium, yttrium and uranium.

7. A sodium sulphur cell as claimed in claim 1 wherein the anodic region adjacent the electrolyte contains a further particulate material in addition to said second metal.

8. A sodium sulphur cell as claimed in claim 7 wherein said further particulate material is an inert material.

9. A sodium sulphur cell as claimed in claim 7 wherein said second metal constitutes at least 1 atomic % of an insoluble metal or sufficient of a soluble metal to give a saturated solution in sodium.

10. A sodium sulphur cell as claimed in claim 1 wherein said first metal is lead.

11. A sodium sulphur cell as claimed in claim 1 wherein the cell is cylindrical with the sodium in an annular region between an anode current collector and one surface of a beta-alumina tube forming said electrolyte element.

* * * * *